United States Patent [19]

Grassl et al.

[11] Patent Number: 5,560,263
[45] Date of Patent: Oct. 1, 1996

[54] ACTUATING ASSEMBLY IN PARTICULAR FOR A VEHICLE SEAT

[75] Inventors: Johann Grassl, Pittersberg; Armin Krahn, Vilseck, both of Germany

[73] Assignee: Grammer AG, Amberg, Germany

[21] Appl. No.: 441,801

[22] Filed: May 16, 1995

[30] Foreign Application Priority Data

Jun. 14, 1994 [DE] Germany ............... 44 20 626.7

[51] Int. Cl.⁶ ..................................... G05G 5/06
[52] U.S. Cl. .................. 74/527; 74/500.5; 248/503.1; 297/361.1; 297/344.1
[58] Field of Search ................ 297/358, 361.1, 297/344.1, 463.1; 74/560, 561, 562, 562.5, 526, 527, 501.5 R–503, 500.5, 528, 530; 248/503.1, 501

[56] References Cited

U.S. PATENT DOCUMENTS

| | | | |
|---|---|---|---|
| 3,192,794 | 7/1965 | Counts | 74/562.5 X |
| 4,143,905 | 3/1979 | Hensel et al. | 297/361.1 |
| 4,159,815 | 7/1979 | Strowik et al. | 74/530 X |
| 4,621,867 | 11/1986 | Perring et al. | 297/361.1 X |
| 4,687,251 | 8/1987 | Kazaoka et al. | 297/344.1 X |
| 5,024,484 | 6/1991 | Buchacz | 297/361.1 X |
| 5,037,155 | 8/1991 | Holm et al. | 297/344.1 X |
| 5,234,253 | 8/1993 | LaPointe et al. | 248/503.1 X |
| 5,320,413 | 6/1994 | Griswold et al. | 297/361.1 |
| 5,511,442 | 4/1996 | Tame | 74/502.6 |
| 5,513,552 | 5/1996 | Ardelt | 74/97.1 |

*Primary Examiner*—Vinh T. Luong
*Attorney, Agent, or Firm*—Elliot M. Olstein; Raymond Lillie

[57] ABSTRACT

An actuating assembly in particular for a vehicle seat has an elongate carrier member and brackets projecting from the carrier member. The brackets carry a pivot bar and actuating elements are mounted pivotably on the pivot bar. To afford user-specific flexibility in regard to the arrangement of the actuating elements in the actuating assembly, the carrier member has spaced-apart, transversely extending openings having a cross-sectional profile with an undercut configuration and each bracket is fitted into a corresponding opening with a fitting portion whose cross-sectional profile is matched to that of the corresponding opening to mount the bracket to the carrier member.

4 Claims, 6 Drawing Sheets

3## ACTUATING ASSEMBLY IN PARTICULAR FOR A VEHICLE SEAT

BACKGROUND OF THE INVENTION

One form of actuating assembly which is intended for actuating more specifically a vehicle seat, and which is of a generally bar-like configuration or elongate structure, comprises an elongate carrier member and actuating elements which are mounted pivotably on a pivot spindle which is arranged in parallel orientation with the carrier member on spaced-apart brackets which project away from the carrier member. The brackets are integral with the carrier member so that the aspect of variability of the arrangement of the actuating elements on the brackets leaves something to be desired. The actuating elements in that actuating assembly are arranged closely one beside the other in order to afford the desired operating convenience.

SUMMARY OF THE INVENTION

An object of the present invention is to provide an actuating assembly, for example for a vehicle seat, which is simple to use and which affords a comparatively high degree of variability in terms of the arrangement of actuating elements thereof.

Another object of the present invention is to provide an elongate actuating assembly, such as for a vehicle seat, so designed as to permit adaptation to different functional situations.

Still another object of the present invention is to provide an actuating assembly for a vehicle seat which affords enhanced ease of assembly of the components thereof in combination with a sound structure.

In accordance with the principles of the present invention the foregoing and other objects are achieved by an actuating assembly which is intended more particularly for a vehicle seat, comprising an elongate carrier member and actuating elements which are mounted pivotably at a pivot axis means disposed in parallel orientation with the carrier member, on spaced-apart support means or brackets projecting from the carrier member. The carrier member has spaced-apart transversely extending openings therein, which have an undercut configuration in their cross-sectional profile. Each support means has a fitting portion having a cross-sectional profile which is matched to that of the corresponding opening of the carrier member, for the support means to fit into a respective such opening in the carrier member.

As will be seen from the detailed description of a preferred embodiment hereinafter, the configuration of the actuating assembly according to the present invention affords the advantage that it is possible for support means or brackets to be combined with the elongate carrier member in any appropriate desired fashion, in other words, the brackets can be arranged on the carrier member at suitable spacings so that the actuating elements of the assembly can be combined in closely adjacent relationship, as required. A further advantage of the actuating assembly according to the invention lies in its simplicity of structure, while the openings can be disposed symmetrically relative to a central line of symmetry so that orientation of the elongate carrier member, in regard to its front side and its rear side, is eliminated. That is advantageous from the point of view of assembly of the components.

In a preferred embodiment of the invention, the support means or brackets each have a first through hole, through which extends the pivot axis means which is a pivot bar for mounting the actuating elements.

Another preferred feature of the invention provides that the support means or brackets each have a second through hole which is spaced from the first through hole and through which extends a bar element.

The above-mentioned pivot axis means which extends through all the support means or brackets and which consequently is of a longitudinal dimension which is at least approximately adapted to the longitudinal dimension of the elongate carrier member serves for pivotably mounting the actuating elements or for limiting the pivotal movement of the actuating elements associated with the respective brackets. In that connection the above-mentioned bar element which is oriented at least approximately in parallel relationship with the pivot axis means can also serve as a pivot axis or for limiting the pivotal movement of the individual actuating elements or for mounting an end portion of an associated spring element for an actuating element.

In accordance with another preferred feature of the invention each actuating element of the actuating assembly according to the invention has a pair of side plate portions spaced by a slot, wherein the corresponding bracket extends into the respective slot and the two side plate portions of the respective pair each have axially aligned first holes through which the pivot axis means extends, and axially aligned second holes through which said bar element extends. Such a configuration for each actuating element, with two side plate portions spaced by a slot, affords axially play-free mounting of an actuating element on the associated bracket if the internal width of said slot is matched to the thickness of the bracket.

Preferably the first and second holes are in the form of slots, while the second holes may also be provided with a detent means.

In another preferred feature of the actuating assembly according to the invention the actuating elements are provided with a fixing portion for a nipple of a respective pull cable assembly. The pull cable assembly can then be connected to a corresponding portion of the vehicle seat on which the actuating assembly is fitted, in order for example to be able to adjust the height of the seat, the angle of inclination of the seat backrest, the angle of inclination of the seat squab or the like, as desired, by actuating the appropriate actuating element of the actuating assembly.

Further objects, features and advantages of the present invention will be apparent from the following description of a preferred embodiment.

DESCRIPTION OF THE PREFERRED EMBODIMENT

Figure 1:
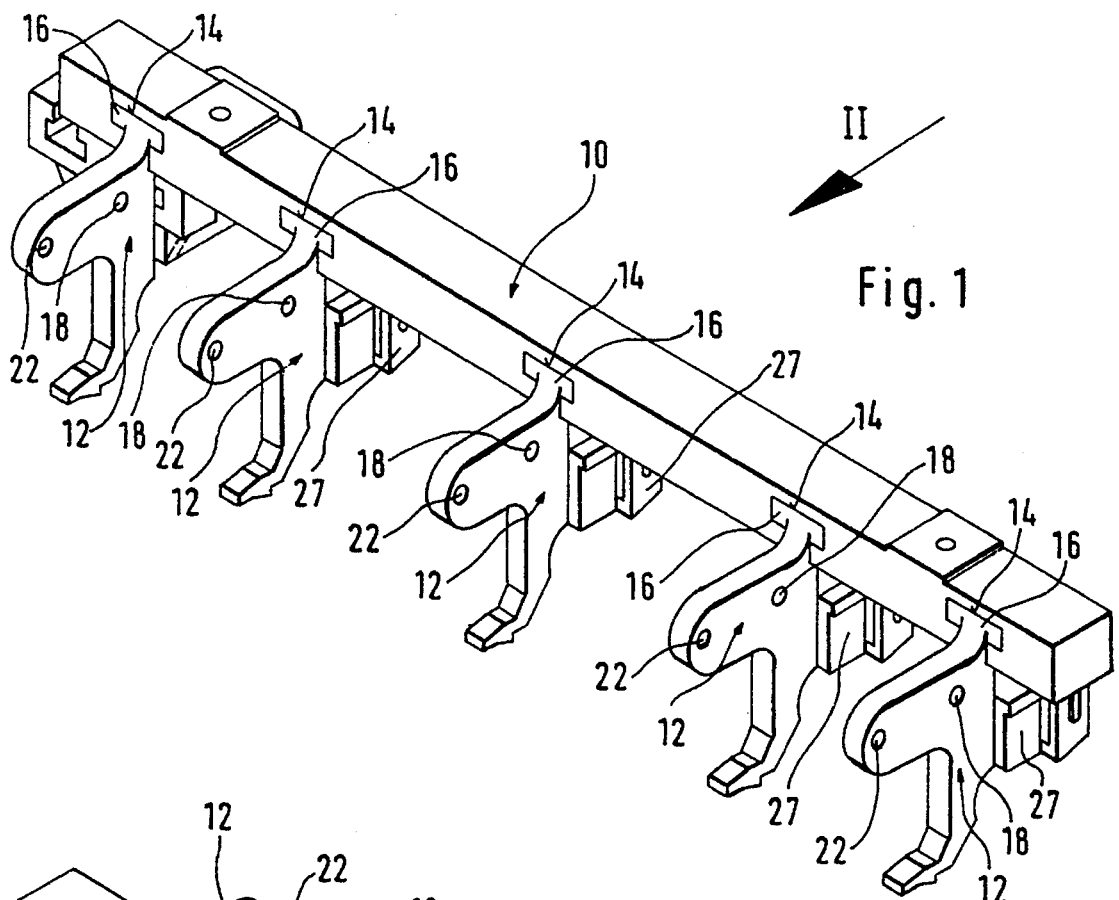
FIG. 1 is a perspective view of a first configuration of essential parts of an actuating assembly according to the invention, viewing in the direction indicated by the arrow I in FIG. 2.

Referring to the drawing showing an actuating assembly which is intended for example for use with a vehicle seat, in order for example to be able to provide for adjustment as desired of various parameters of the seat such as the height of the seat, the angle of inclination of the backrest, the angle of inclination of the seat squab, and so forth, of the seat, it will be noted that the same details and features are identified in each of the Figures by the same references, so that there will be no need to repeat a full detailed description of each of FIGS. 1 through 7, having regard to the presence of common features and components therein.

Figure 2:
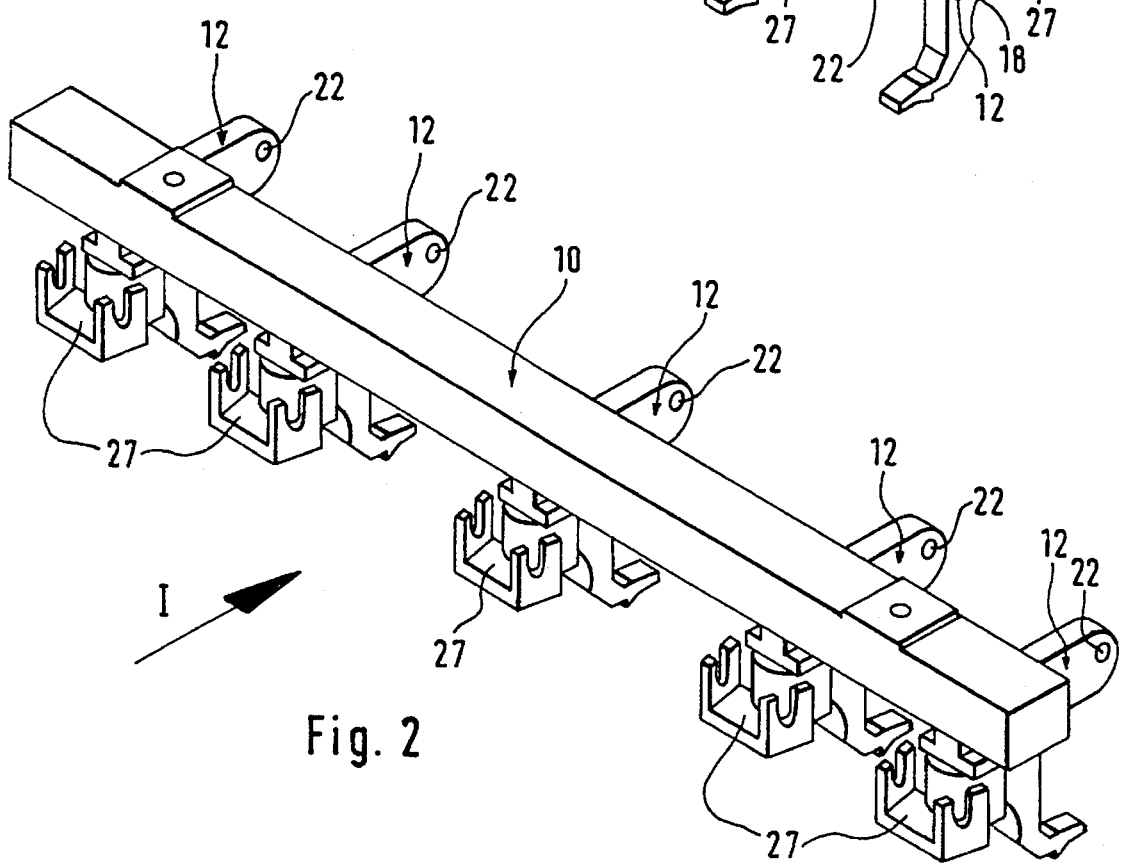
FIG. 2 is a perspective view of the actuating assembly shown in FIG. 1, viewing in the direction indicated by the arrow II in FIG. 1.
Figure 3:
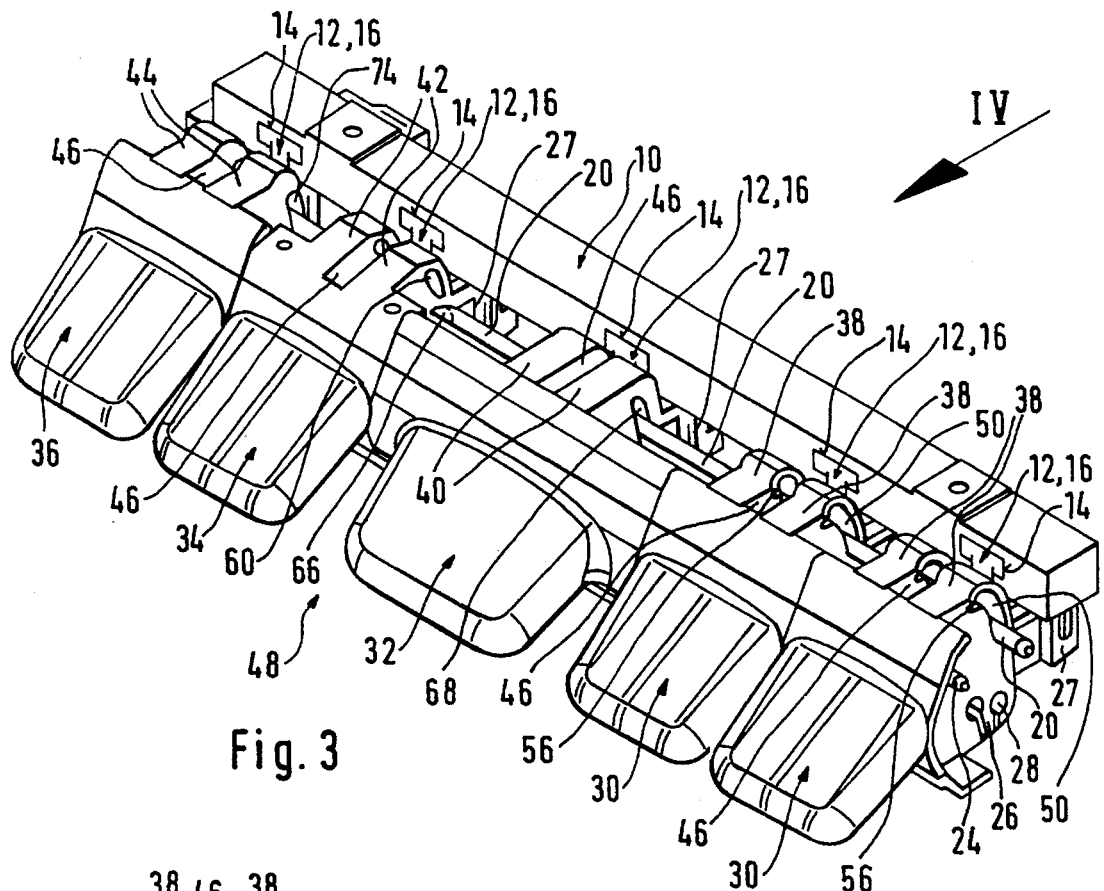
FIG. 3 is a perspective view of a carrier member and brackets of the actuating assembly shown in FIG. 1, in combination with associated actuating elements.
Figure 4:
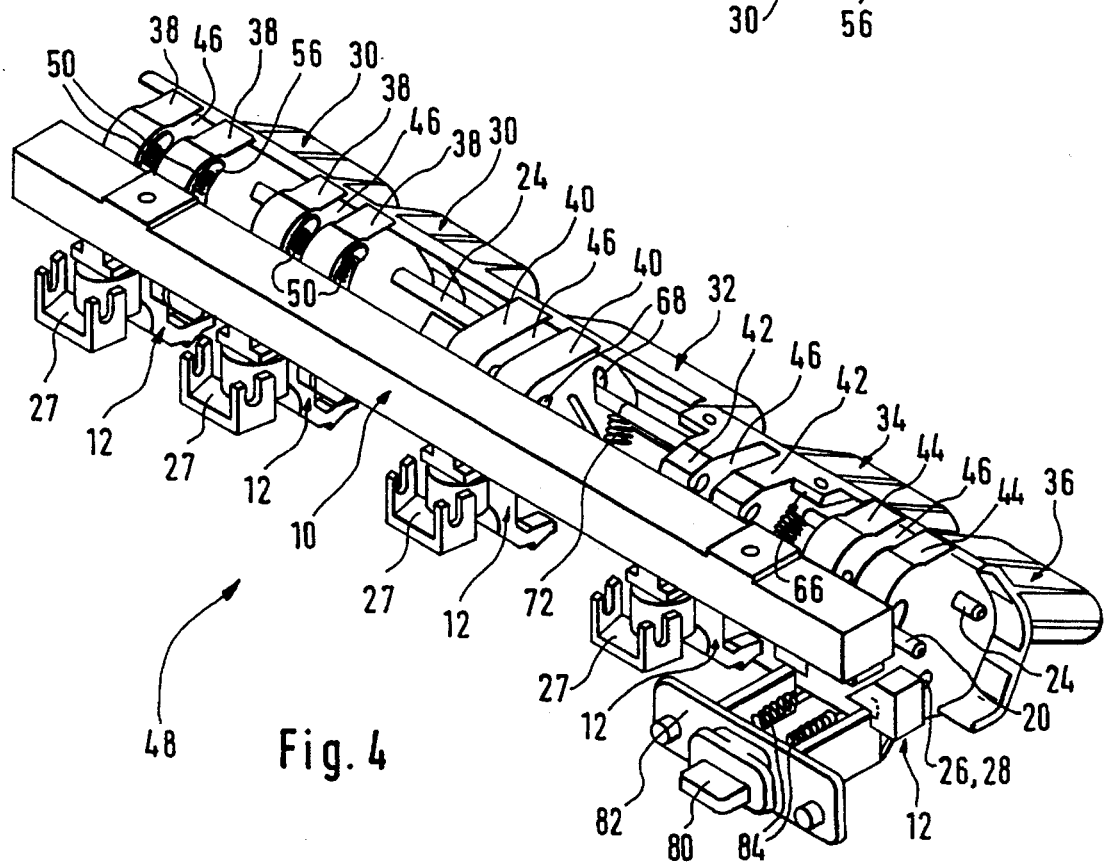
FIG. 4 is a perspective view of the actuating assembly shown in FIG. 3, viewing in the direction indicated by the arrow IV.
Figure 5:
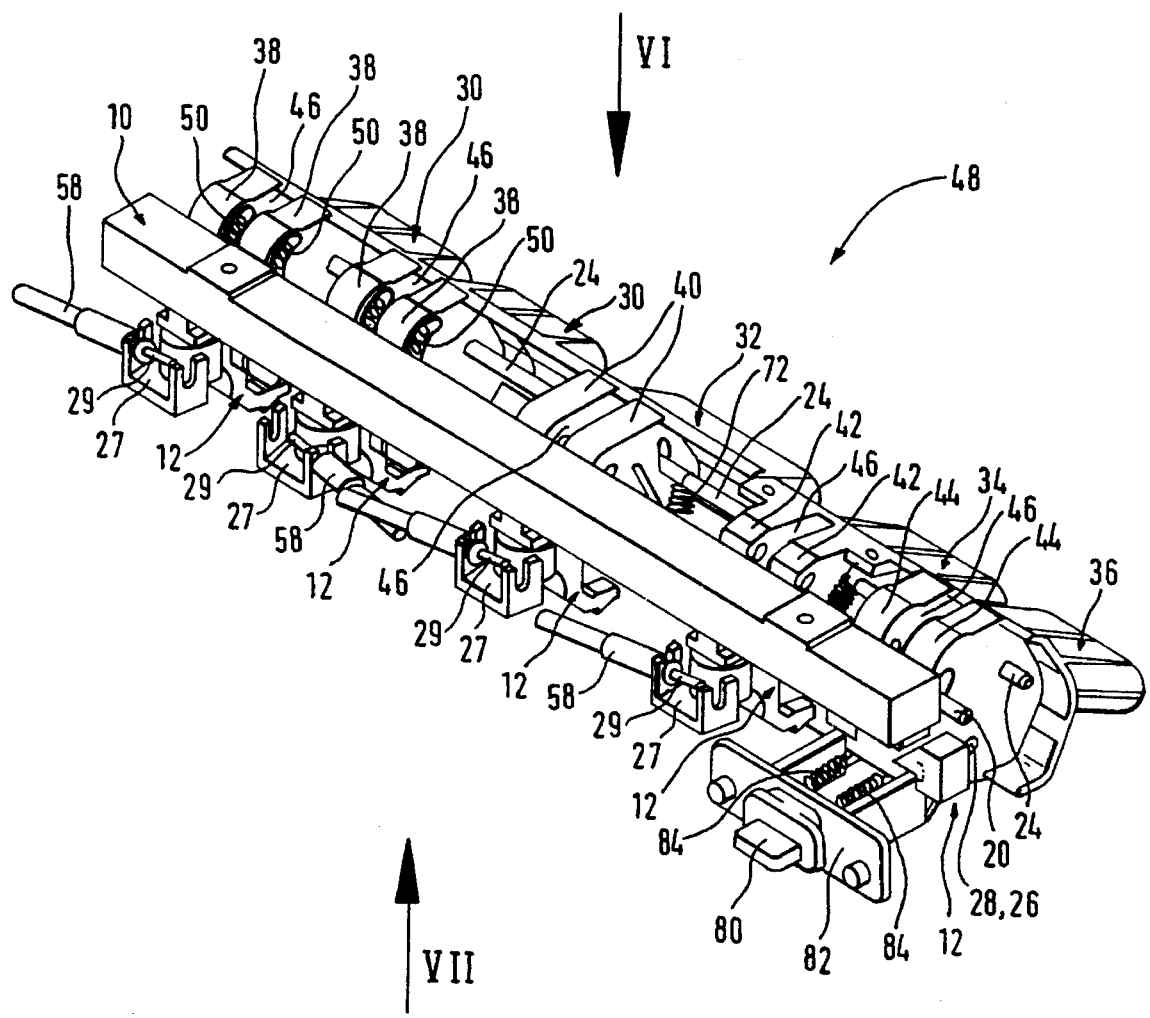
FIG. 5 is a perspective view, similar to that shown in FIG. 4, of the actuating assembly, this Figure, unlike FIG. 4, also showing an unlocking device and pull cable assemblies associated with the respective actuating elements.
Figure 6:
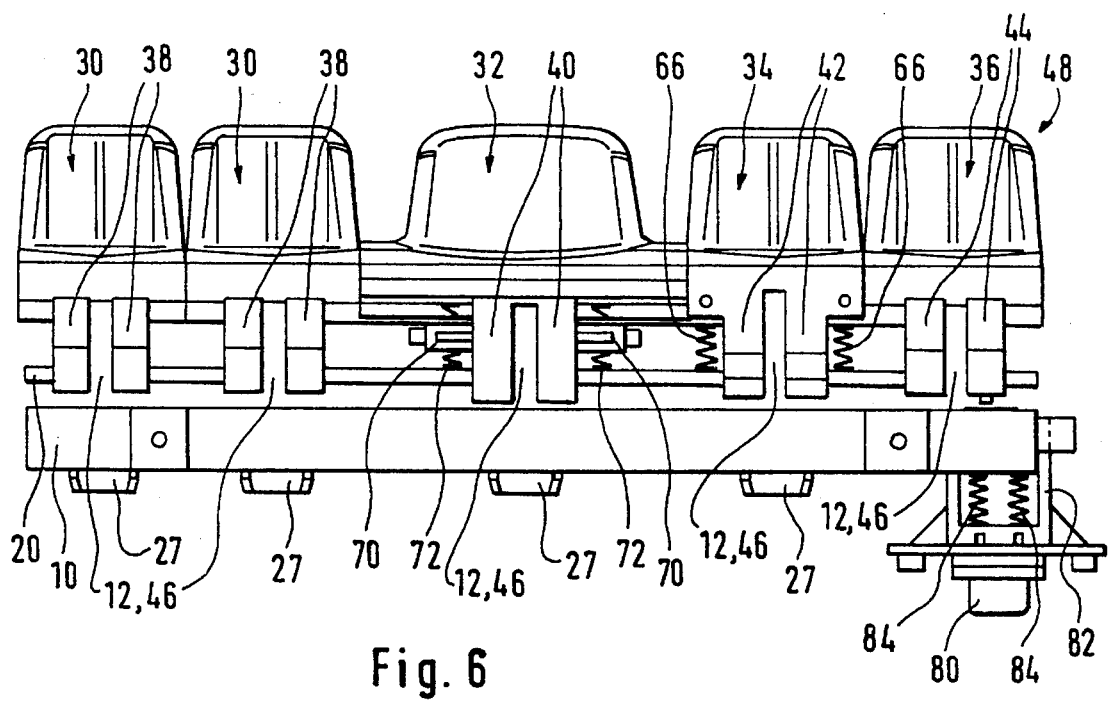
FIG. 6 is a view of the actuating assembly shown in FIG. 5 from above, in the direction indicated by the arrow VI in FIG. 5.
Figure 7:
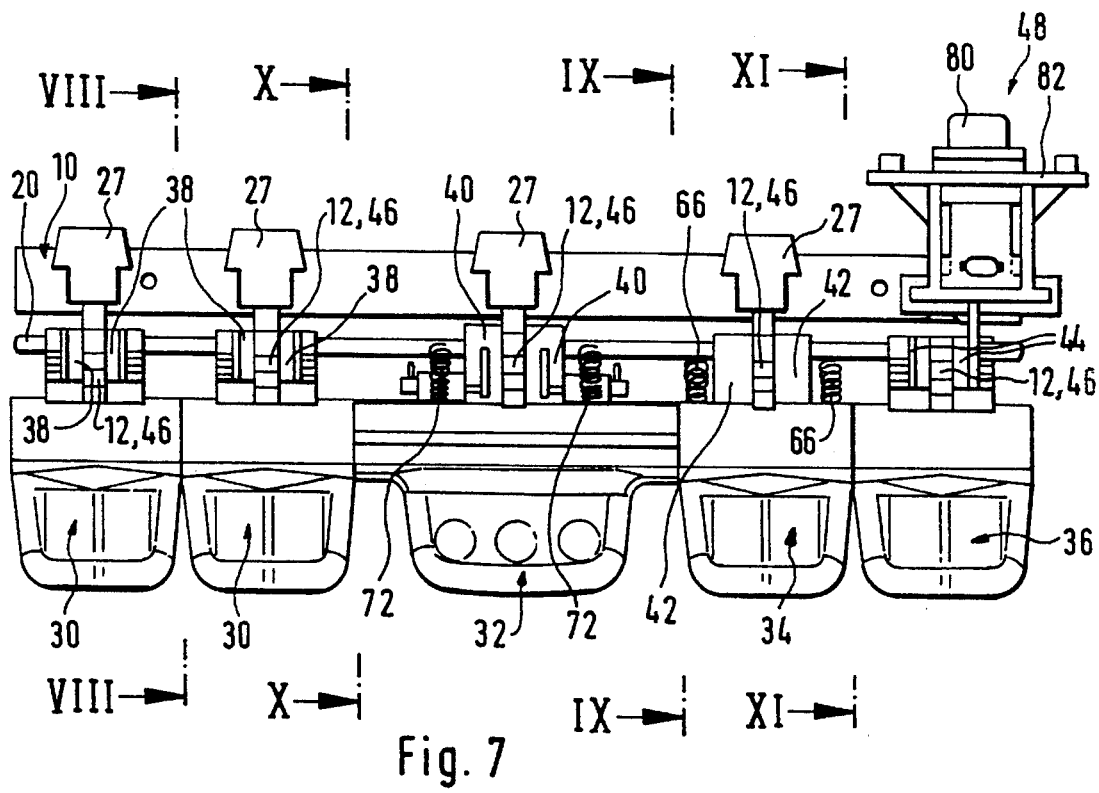
FIG. 7 is a view of the actuating assembly shown in FIG. 5 viewing from below, in the direction indicated by the arrow VII in FIG. 5.

Looking now at FIGS. 1 and 2, shown therein as perspective views from the front and from the rear respectively is an elongate carrier member 10 from which support means in the form of brackets 12 project. To carry the brackets 12, the carrier member 10 has transversely extending openings 14 which are spaced from each other in the longitudinal direction of the carrier member and which are of a cross-sectional profile having an appropriate undercut configuration. In the construction shown in FIGS. 1 and 2, the openings 14 are of a cross-sectional profile which is of a generally rectangularly dovetail-like configuration, but it will be appreciated that it would also be possible for the openings 14 to be of a cross-sectional profile with a wedge-like or tapered undercut configuration, or any other suitable configuration such as to retain the respective bracket 12 to the carrier member 10 in the respective opening 14.

Each of the brackets 12 has a base or fitting portion 16 of a cross-sectional profile which corresponds without play or clearance to the internal cross-sectional profile of the corresponding opening 14 in the carrier member 10 so that it is easily possible for the brackets 12 to be fitted to the carrier member 10 in the desired arrangement thereon, in an operation which does not take up a great deal of time.

FIG. 1 shows an elongate carrier member 10 having five openings 14 extending transversely therethrough. It is however also possible for the elongate carrier member 10 to have any suitable number of spaced-apart openings 14 in order to make the actuating assembly of the invention more variable in regard to the arrangement of the brackets 12 on the carrier member 10. The openings 14 are advantageously disposed symmetrically relative to a central axis of symmetry.

Each of the brackets 12 has a first through hole 18. The first holes 18 are axially aligned with each other in the condition of the brackets 12 in which they are assembled to the carrier member 10, so that it is possible for a common pivot axis member 20 in the form of a bar to be passed through the first holes 18 in the brackets 12, as can be seen from FIGS. 3 through 5. In addition each bracket 12 has a second through hole 22 which is disposed at a spacing from the first hole 18, as can be seen from FIGS. 1 and 2. The second holes 22 are also axially aligned with each other in the condition of the brackets 12 in which they are assembled to the carrier member 10, so that it is possible for a bar element 24 to be passed through the second holes 22, as once again can be seen from FIGS. 3 through 5.

At their rear side remote from the holes 18 and 22, the brackets 12 are each provided with a fixing portion as indicated at 27 in FIGS. 1 and 2, and which is of a double-sided configuration as can be particularly clearly seen from FIG. 2. In other words, the fixing portion 27 of each bracket 12 has two fixing plate portions disposed at a spacing from each other in the longitudinal direction of the carrier member 10. The fixing portion 27 of each bracket 12 serves for example as an abutment for the sheath of a pull cable as indicated at 29 in FIG. 5, the sheath and the cable 29 forming a Bowden cable assembly as indicated at 58 in FIG. 5. Reference numeral 28 denotes a nipple on the respective cable 29.

The brackets 12 and the pivot axis member 20 which extends through the first holes 18 in the brackets 12 and the bar element 24 which extends through the second holes 22 in the brackets 12 serve to provide for definedly pivotable mounting of actuating elements 30, 32, 34 and 36 which can be clearly seen for example from FIGS. 3 through 7. Each of the actuating elements 30, 32, 34 and 36 has a pair of side plate portions indicated at 38, 40, 42 and 44 respectively, which are spaced from each other by a respective slot 46. The width of each slot is adapted to the wall thickness of the corresponding bracket 12, with substantially no play or clearance in relation thereto, so that the actuating elements 30, 32, 34 and 36 are arranged in an axially play-free manner on the actuating assembly which is generally identified by reference numeral 48 in FIGS. 3 through 7.

As indicated above, the same features and details are identified by the same references in FIGS. 1 through 7 so that there is no need here for all features to be described in full detail in connection with each of those Figures.

Figure 8:
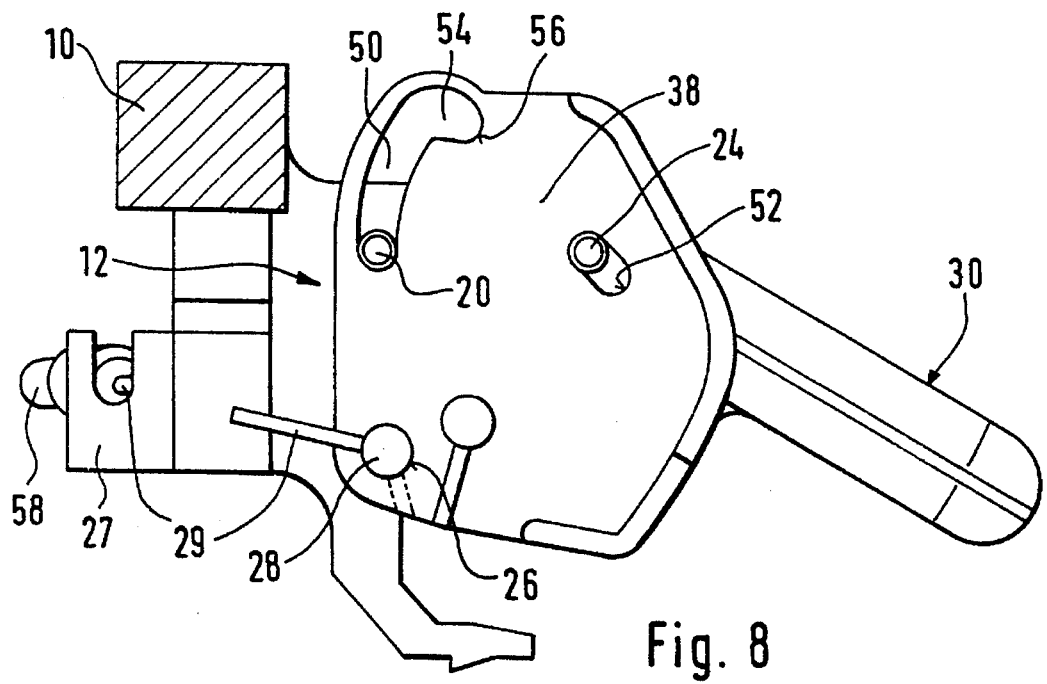
FIG. 8 is a view in section taken along line VIII—VIII in FIG. 7 to show a first configuration of an actuating element.

Looking therefore now at FIG. 8, shown therein are the carrier member 10 which is illustrated in section, a bracket 12 projecting away from the carrier member 10 and an actuating element 30 whose two side plate portions each have an arcuate slot 50 and a short rectilinearly extending slot 52. The pivot axis member 20 extends through the two slots 50 and the bar element 24 extends through the two short straight slots 52. The center of curvature of the arcuate slot 50 is defined by the bar element 24. Each arcuate slot 50 has a depression or recess 56 at its one end portion 54. The two recesses 56 of the two side plate portions 38, such recesses being aligned with each other, and the two aligned short straight slots 52 are matched to each other so that an actuating element 30 of such a configuration is suitable to provide for actuation in one direction and for an arresting effect after suitable actuation by means of the recesses 56. Reference numeral 28 also identifies in FIG. 8 the nipple which is fixed to the end of a pull cable 29. The cable 29 is part of a Bowden cable assembly 58 whose sheath is appropriately supported against the fixing portion 27 of the bracket 12, as described above. Reference 26 denotes a fixing portion for securing the nipple 28.

Figure 9:
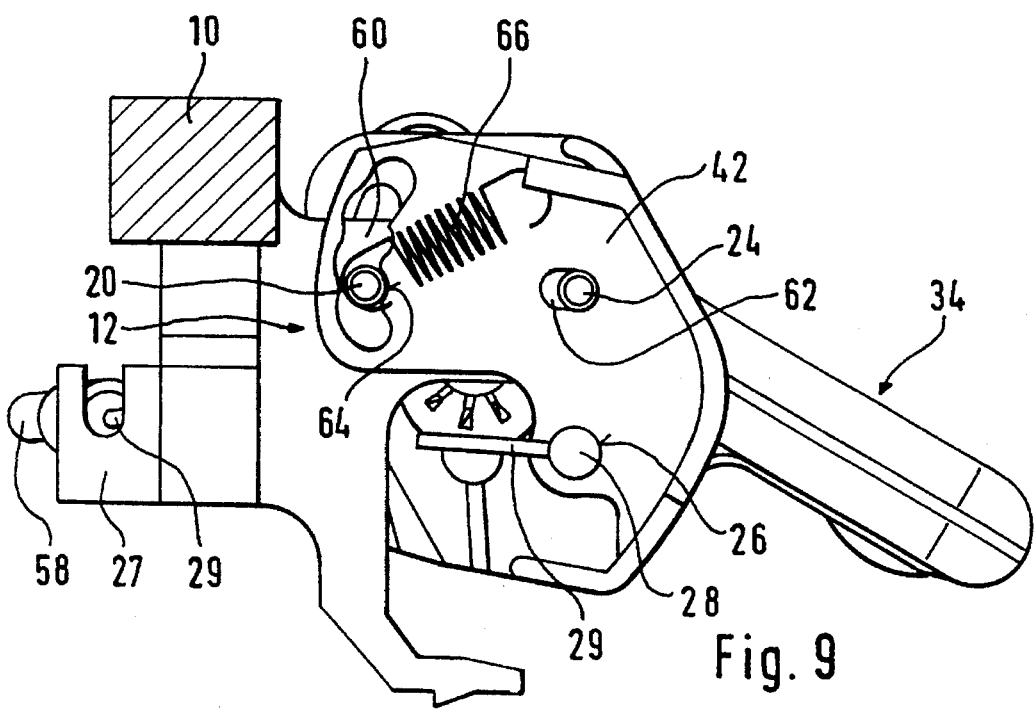
FIG. 9 is a view in section taken along line IX—IX in FIG. 7 to show a second configuration of an actuating element.

Reference is now made to FIG. 9 showing the carrier member 10 in section, with a bracket 12 projecting from the carrier member 10. The pivot axis member 20 and the bar element 24 extend through the bracket, the pivot axis member 20 and the bar element 24 together with the bracket 12 providing the arrangement for mounting a respective actuating element 34. In the illustrated actuating element 34 the two spaced-apart side plate portions 42 have an arcuate slot 60 and a short straight slot 62. The center of curvature of the arcuate slot 60 is defined by the bar element 24. Each of the two arcuate slots 60 is provided with a detent means 64. The detent means 64 is provided more particularly at the edge of the slot 60 which is towards the bar element 24, and is of a corrugated or wave-like configuration so as to define a plurality of depressions into which the pivot axis member 20 can selectively engage to provide the detent effect. For that purpose, a respective tension spring 66 is operatively disposed between the pivot axis member 20 and the actuating element 34, on each side, that is to say laterally beside the two side plate portions 42, in which respect attention is also directed for example to FIGS. 6 and 7 which also show this part of the arrangement. In FIG. 9 also reference numeral 28 denotes a nipple which is fixed to the free end of a pull cable 29 of a Bowden cable assembly 58. For the purposes of fixing the nipple 28 the actuating element 34 is provided with a respective fixing portion 26 at each of two spaced-apart side plate portions 42. The sheath of the associated Bowden cable assembly 58 is again supported against the fixing portion 27 which projects from the corresponding bracket 12 at the rear side thereof.

The actuating element 34 shown in FIG. 9 is intended more particularly to be able to provide an adjusting function in a multi-step procedure as desired, more particularly for example on a motor vehicle seat.

Figure 10:
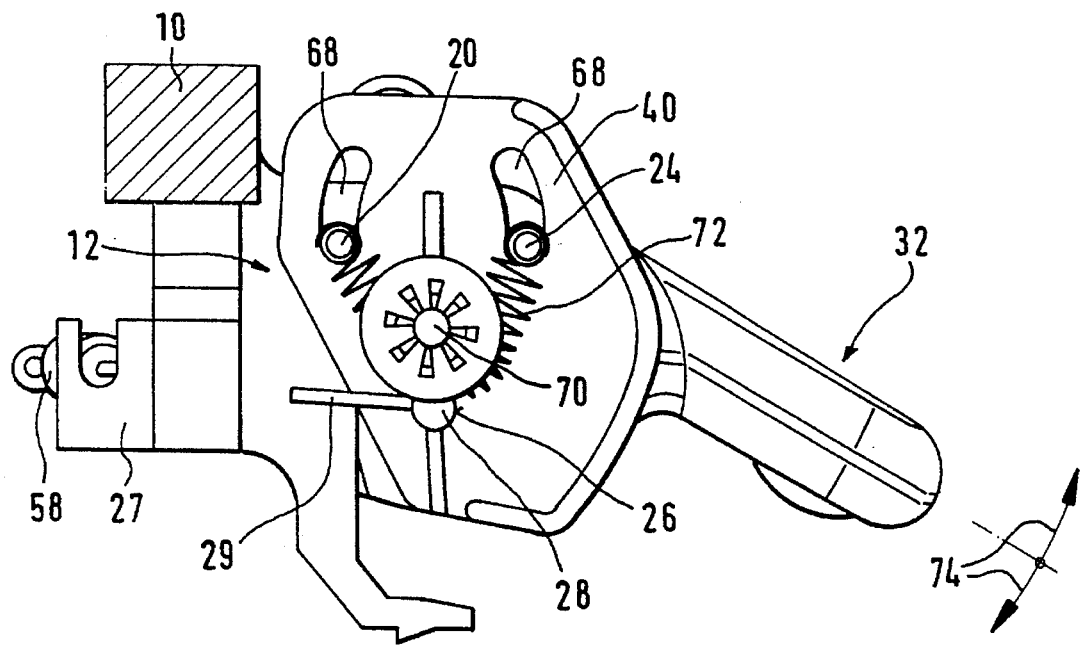
FIG. 10 is a view in section taken along line X—X in FIG. 7 to show a third configuration of an actuating element.

FIG. 10 is a view of the carrier member 10 in section, with a bracket 12 which projects from the carrier member 10 in the transverse direction and on which an actuating element 32 is mounted. The actuating element 32 has two side plate portions 40 which embrace the bracket 12. Each of the two spaced-apart side plate portions 40 has two arcuate slots 68 which face towards each other. The pivot axis member 20 extends through the one slot 68 while the bar element 24 extends through the other slot 68. The centers of curvature of the two slots 68 are defined by the pivot axis member 20 and the bar element 24. Projecting away from each of the two side plate portions 20 is a respective hub 70 around which a spring element 72 passes. It will be seen that the spring element 72 is in the form of a coil tension spring which is diverted in a generally U-shape by being passed around the respective hub 70. One end portion of the spring element 72 is fixed to the pivot axis member 20 while its second end portion is fixed to the bar element 24. Such a design configuration for the actuating element 32 serves to afford two adjustment functions, more particularly on a motor vehicle seat, in two mutually remote sides about the central position shown in FIG. 10. Those two adjustment functions which are thus produced by movement of the actuating element 32 in opposite directions, about the illustrated central position, are indicated by the two arcuate arrows 74 pointing in opposite directions away from each other.

Each of the two side plate portions 40 again provides a fixing portion 26 for a nipple 28 which is fixed to the end of an associated pull cable 29. The pull cable 29 is part of a Bowden cable assembly generally indicated at 58, the sheath of which is supported against the fixing portion 27 on the bracket 12.

Figure 11:
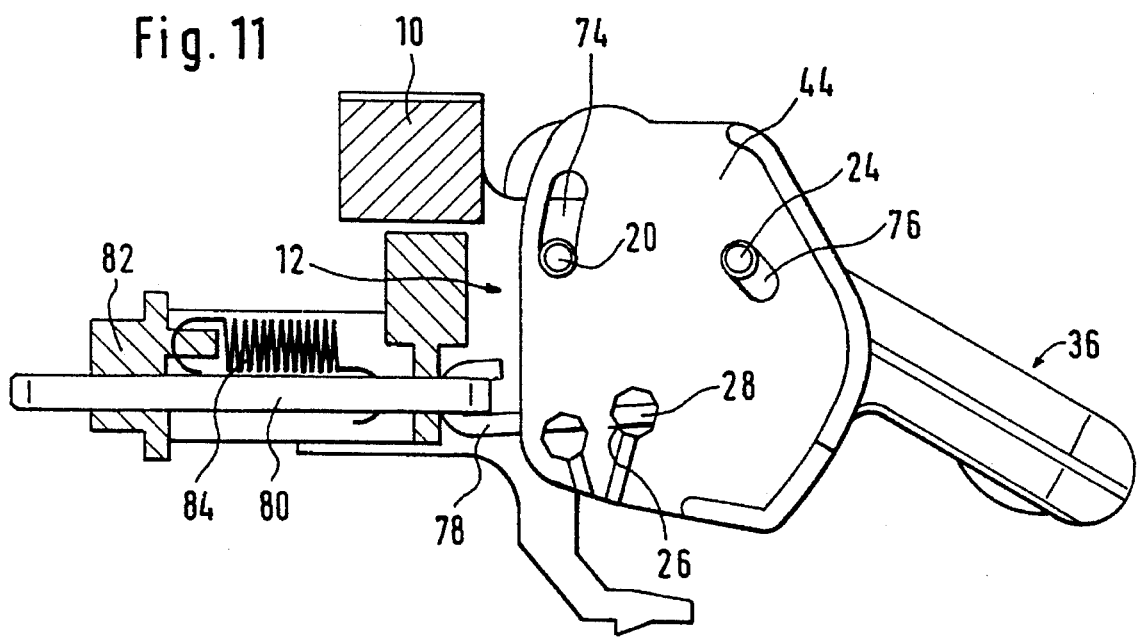
FIG. 11 is a view in section taken along line XI—XI in FIG. 7 to show a fourth configuration of an actuating element.

FIG. 11 shows an actuating element 36 which is pivotably arranged on a bracket 12 projecting away from the carrier member 10 which is shown in section. The actuating element 36 is in principle similar to the actuating element 30 shown in FIG. 8, that is to say it has two side plate portions 44 which each have an arcuate slot 74 and a short straight slot 76, similarly to the slots 50 and 52 shown in FIG. 8. The only difference in relation to the configuration shown in FIG. 8 is that the arcuate slot 74 does not have a depression or recess to provide an arresting action. Each of the two side plate portions 44 is provided with a fixing portion 26 for a nipple 28 which is fixed to the free end of a hook 78. The hook 78 is connected to a lock bolt member 80 which is linearly movably guided in a housing 82 of a frame-like configuration. The housing 82 can be fixed to the bracket 12. At least one tension spring element 84 is disposed in a mechanically prestressed condition between the housing 82 and the lock bolt member 80, as can also be seen from FIGS. 4 and 5. The actuating element 36 shown in FIG. 11 serves in particular to provide an unlocking function on a vehicle seat to which the actuating assembly according to the invention is fitted.

It will be appreciated that the above-described structures have been set forth solely by way of example and illustration of the present invention and that various modifications and alterations may be made therein without thereby departing from the spirit and scope of the invention.

What is claimed is:

1. In a vehicle seat, an actuating assembly comprising an elongate carrier member having openings which are spaced from each other in the longitudinal direction of the carrier member and extend transversely relative thereto and have a cross-sectional profile with an undercut configuration, a plurality of support means on the carrier member at spacings from each other in the longitudinal direction thereof and projecting from the carrier member, each support means having a fitting portion engaged into a said opening in said carrier member and having a cross-sectional profile matched to the cross-sectional profile of the corresponding opening in said carrier member, a pivot axis means carried by said support means and providing a pivot axis in parallel orientation with the carrier member, and actuating elements mounted pivotably at said pivot axis means.

2. An actuating assembly comprising an elongate carrier member having openings which are spaced from each other in the longitudinal direction of the carrier member and extend transversely relative thereto and have a cross-sectional profile with an undercut configuration, a plurality of support means on the carrier member at spacings from each other in the longitudinal direction thereof and projecting from the carrier member, each support means having a fitting portion engaged into an opening in said carrier member and having a cross-sectional profile matched with the cross-sectional profile of the corresponding opening in said carrier member, a pivot bar carried by said support means and providing a pivot axis in parallel orientation with the carrier member, and actuating elements mounted pivotably at said pivot bar, wherein each of said support means has a first through hole and a second through hole spaced from said first through hole, wherein said pivot bar extends through said first through holes for mounting the actuating elements, and said assembly includes a bar element passing through said second through holes, wherein each actuating element has a pair of side plate portions spaced by a slot, wherein the corresponding support means extends into the respective slot, and the side plate portions of each respective pair each have axially aligned first slots through which said pivot bar extends and axially aligned second slots through which said bar element extends.

3. An actuating assembly as set forth in claim 2 wherein said second slots are provided with detent means.

4. An actuating assembly as set forth in claim 2 including a pull cable assembly having a nipple for each actuating assembly, wherein each actuating element has a fixing portion for the nipple of the respective pull cable assembly.

* * * * *